United States Patent
Buitenhuis et al.

(10) Patent No.: US 10,058,961 B2
(45) Date of Patent: Aug. 28, 2018

(54) PROCESS OF FORMING AND A SEAL FOR AN ENGINE

(71) Applicant: Dynamic Metals, LLC, Elkhart, IN (US)

(72) Inventors: Bill Buitenhuis, Bristol, IN (US); Jack Opielka, Mississauga (CA)

(73) Assignee: Dynamic Metals, LLC, Elkhart, IN (US)

( * ) Notice: Subject to any disclaimer, the term of this patent is extended or adjusted under 35 U.S.C. 154(b) by 68 days.

(21) Appl. No.: 14/881,820

(22) Filed: Oct. 13, 2015

(65) Prior Publication Data

US 2016/0101489 A1    Apr. 14, 2016

Related U.S. Application Data

(60) Provisional application No. 62/063,177, filed on Oct. 13, 2014.

(51) Int. Cl.
| | |
|---|---|
| *F16J 9/00* | (2006.01) |
| *B23P 15/00* | (2006.01) |
| *B21F 37/00* | (2006.01) |
| *B21D 5/08* | (2006.01) |
| *B21D 53/20* | (2006.01) |

(52) U.S. Cl.
CPC .............. *B23P 15/00* (2013.01); *B21D 5/08* (2013.01); *B21D 53/20* (2013.01); *B21F 37/00* (2013.01); *F05D 2220/32* (2013.01); *F05D 2230/26* (2013.01); *F05D 2240/55* (2013.01); *F05D 2250/75* (2013.01)

(58) Field of Classification Search
CPC . B23P 15/00; B21D 5/08; B21D 53/20; B21F 37/00; F05D 2220/32; F05D 2230/26; F05D 2250/75; F16J 9/00; F16J 15/08
USPC ......................................................... 277/345
See application file for complete search history.

(56) References Cited

U.S. PATENT DOCUMENTS

| | | | | |
|---|---|---|---|---|
| 3,482,302 A | * | 12/1969 | Williams | ............. B23K 1/0018 |
| | | | | 228/173.6 |
| 4,589,666 A | * | 5/1986 | Halling | ................. F16L 51/025 |
| | | | | 277/631 |
| 4,759,555 A | * | 7/1988 | Halling | ...................... F16J 9/18 |
| | | | | 277/631 |
| 6,352,267 B1 | | 3/2002 | Rode | |
| 8,714,565 B1 | * | 5/2014 | Cornett | ................. F01D 11/005 |
| | | | | 277/644 |
| 2006/0045746 A1 | | 3/2006 | Synnott | |

(Continued)

OTHER PUBLICATIONS

International Search Report and Written Opinion of PCT/US2015/055289, dated Dec. 28, 2015.

*Primary Examiner* — Nathan Cumar (74) *Attorney, Agent, or Firm* — Dinsmore & Shohl LLP (57) ABSTRACT

A process of forming a turbine engine seal includes the steps of: providing a flat strip of material; roll forming the flat strip of material forming an asymmetric profile in the flat strip of material; coiling the formed asymmetric profile into an overlapping ring shape; cutting the circular shape to a predetermined length; and joining ends of the predetermined length forming the seal. The seal includes at least two peaks that are formed on opposing sides of a gap. The at least two peaks contact opposing sides of a U shaped profile at a zero radius. The asymmetric profile includes a circular shape and the ends are joined.

6 Claims, 8 Drawing Sheets

(56) References Cited

U.S. PATENT DOCUMENTS

2006/0218787 A1* 10/2006 More .................. F16J 15/0887
29/888.3
2007/0235948 A1    10/2007 Halling
2008/0073861 A1     3/2008 Iguchi et al.
2009/0243228 A1    10/2009 Heinemann et al.

* cited by examiner

PROCESS OF FORMING AND A SEAL FOR AN ENGINE

CROSS-REFERENCE TO RELATED APPLICATIONS

This application claims priority of U.S. Provisional Patent Application Ser. No. 62/063,177, filed Oct. 13, 2014, the entire contents of which are incorporated herein by reference.

FIELD OF THE INVENTION

The invention relates to turbine engine seals and a process for manufacturing a turbine engine seal.

BACKGROUND OF THE INVENTION

Turbine engine seals may be utilized to seal various parts of a turbine engine and prevent migration of air and other fluids of the turbine engine. Generally, such prior art engine seals are formed by machining a desired pattern into a blank of material. The manufacturing process of such prior art seals is a complicated and expensive process. There is therefore a need in the art for a process of manufacturing an engine seal and an engine seal that is cost effective and easy to manufacture. There is a further need in the art for an engine seal and process that may be easily modified for applications on various types of turbine engines. There is also a need in the art for an engine seal that is roll formed from a flat strip of material and meets the specifications and tolerance restrictions for use in a turbine engine.

SUMMARY OF THE INVENTION

In one aspect there is disclosed a process of forming a turbine engine seal comprising the steps of: providing a flat strip of material; roll forming the flat strip of material forming an asymmetric profile in the flat strip of material; coiling the formed asymmetric profile into an overlapping ring; cutting the overlapping ring to a predetermined length; and joining ends of the predetermined length forming a circular ring of a specified diameter.

In another aspect there is disclosed a seal for a turbine that includes an asymmetric profile including opposing ends. The asymmetric profile includes a U shaped profile defining a gap. At least two peaks are formed on opposing sides of the gap. The at least two peaks contact opposing sides of the U shaped profile at a zero radius. The asymmetric profile includes a circular shape and the ends are joined.

In a further aspect there is disclosed a seal for a turbine that includes an asymmetric profile including opposing ends. The asymmetric profile includes a U shaped profile defining a gap. At least two peaks are formed on opposing sides of the gap. The at least two peaks contact opposing sides of the U shaped profile forming a 180 degree bend. The asymmetric profile includes a circular shape and the ends are joined.

DETAILED DESCRIPTION OF THE PREFERRED EMBODIMENTS

Referring to FIGS. 1-7 there is shown a process and structure of one embodiment of a seal 20 for an engine. The process includes roll forming in a plurality of passes an asymmetric profile 22 in a flat strip 24 of material, coiling the formed asymmetric profile 22 into an overlapping ring; cutting the overlapping ring to a desired length and then joining the ends of the cut circular shape to form a seal 20 which is a circular ring of a specified diameter.

In one aspect, the seal 20 may be formed in a roll forming operation that continuously bends the flat strip of metal stock. In one aspect, the strip stock may be formed of various metal materials with the ability to form 180 degree bends or with an inside bend radius that is equal to zero. Examples of various materials include stainless steel, Inconel type alloys such as Inconel 718, Inconel 625 and other alloys including C263.

The flat strip stock is passed through sets of rolls mounted on consecutive stands, each set performing an incremental part of the bend, until the desired cross-section profile is obtained. Referring to FIGS. 1-4, there is shown a flower diagram of the process for one embodiment of a seal 20. As shown in the figures, in passes 1-6 the flat strip stock 24 is incrementally deformed to have a generally U shaped profile 26 having a gap 27 and having distally extending legs 28. In passes 7-11 the distally extending legs 28 are deformed to form generally V shaped profiles 30 on opposing sides of the U shaped profile 26. In passes 12-17 one of the distally extending legs 28A is folded at a radius 32 such that the leg is folded to contact the V shaped profile 30. The leg 28A is also deformed to form a radius 33 such that the leg extends at a predetermined angle which is further changed in the following process steps to form a defined angle which in the completed part extends at approximately 90 degrees. The opposing distally extending leg 28B is deformed to form a radius 33 such the leg extends at a predetermined angle which is further changed in the following process steps to form a defined angle which in the completed part extends at approximately 90 degrees. In passes 18-24, the V shaped profiles 30 are compressed to contact the generally U shaped profile 26. The V shaped profiles 30 include an approximate zero inside radius 32 such that the V shaped profile 30 is folded to contact the U shaped profile 26. The distally extending legs 28 are further deformed to form the desired angle as described above. In the finished profile the strip includes at least two peaks 34 that are unequally spaced from each other to define the asymmetric profile 22. In one aspect, the tolerances of the peaks 34 may be maintained to within two thousandths of an inch following the roll forming, coiling and joining steps.

Figure 1:
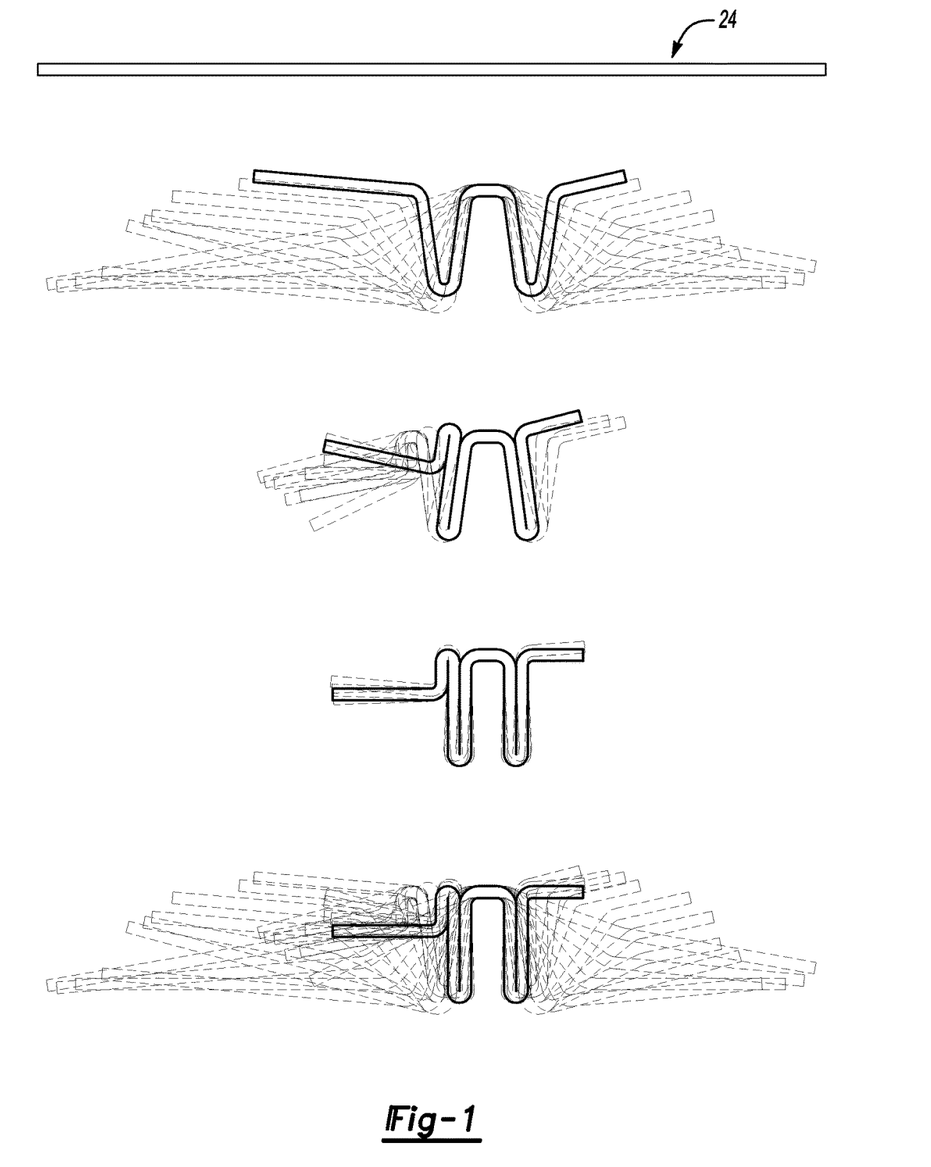
FIG. 1 are flower diagrams of the roll form process of one embodiment of a seal.
Figure 2:
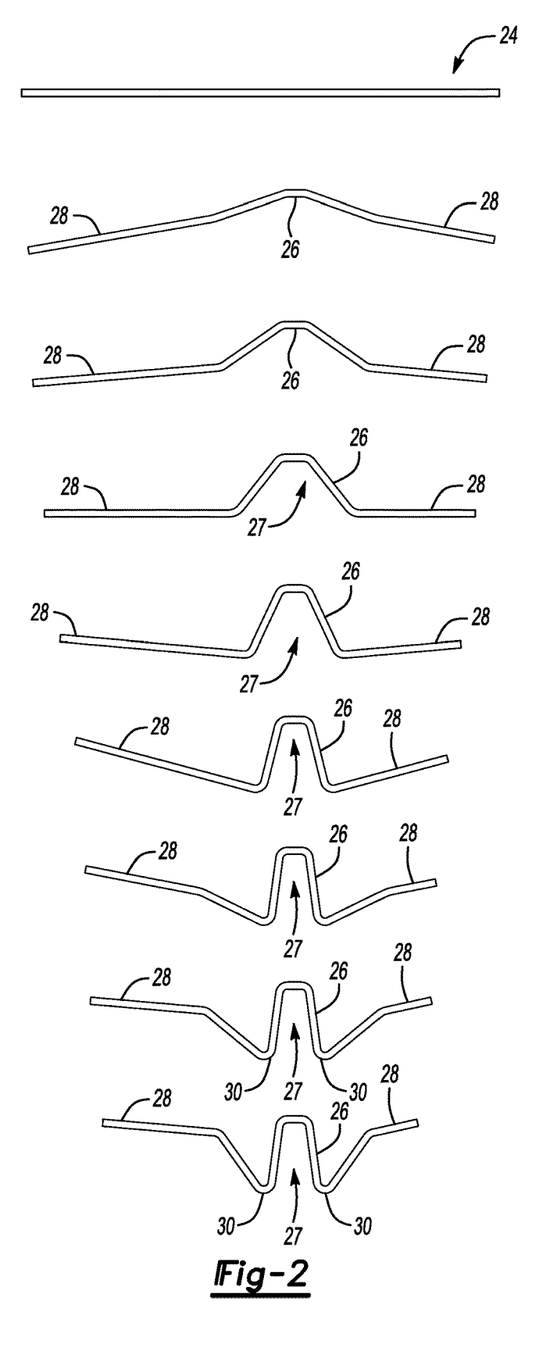
FIG. 2 are flower diagrams of the roll form process of passes 1-8 of one embodiment of a seal.
Figure 3:
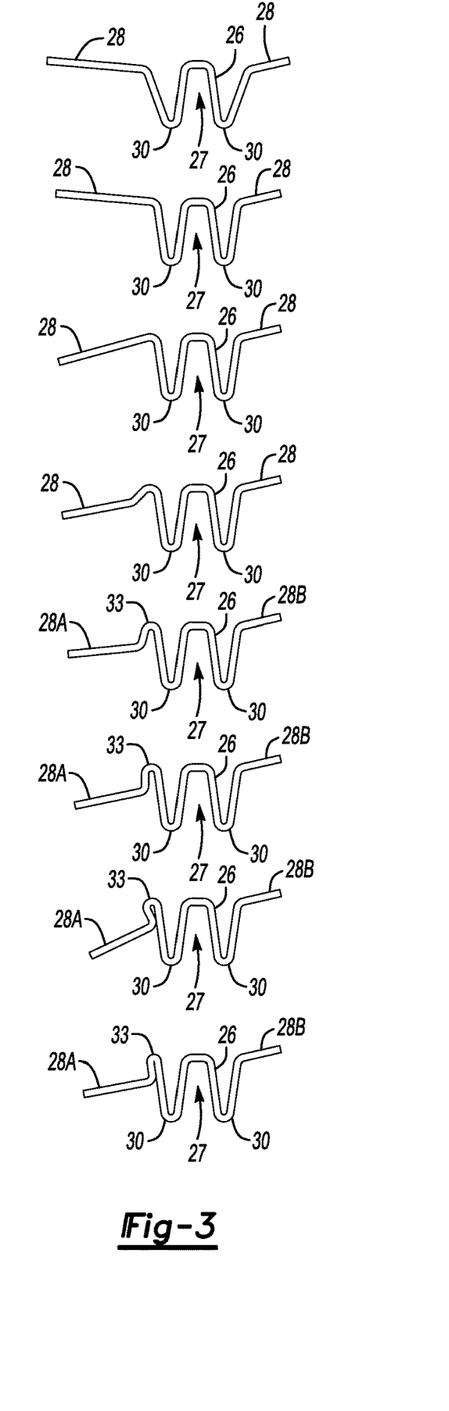
FIG. 3 are flower diagrams of the roll form process of passes 9-16 of one embodiment of a seal.
Figure 4:
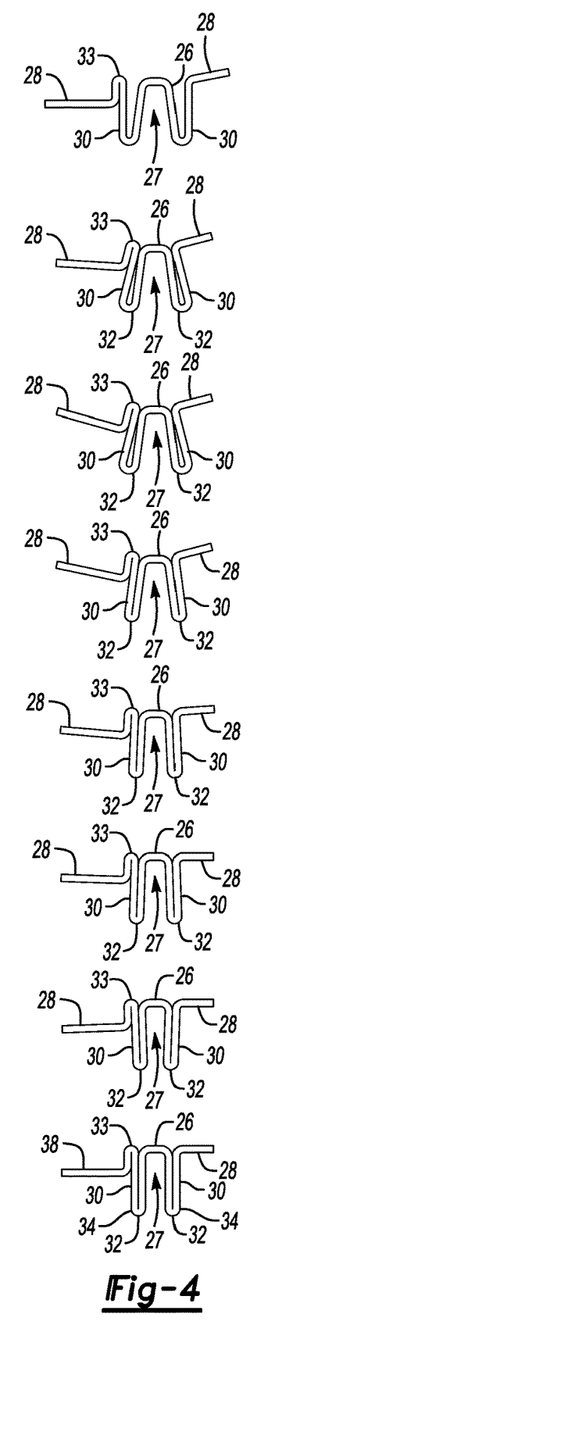
FIG. 4 are flower diagrams of the roll form process of passes 17-24 of one embodiment of a seal.
Figure 5:
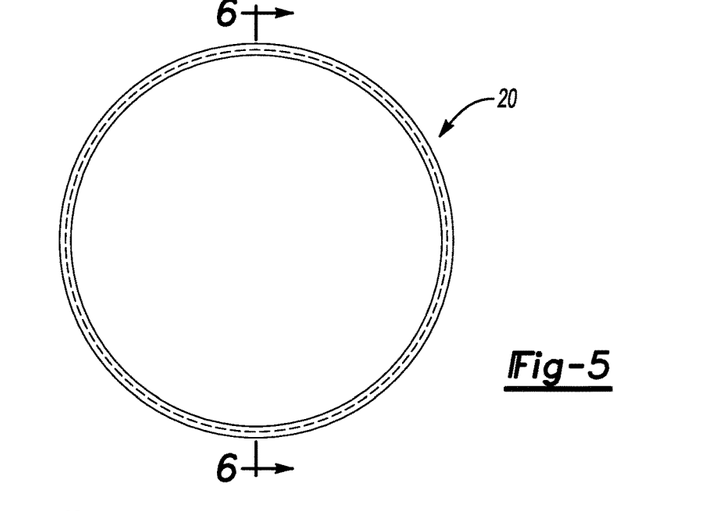
FIG. 5 is a perspective view of the seal following roll forming, coiling and joining of one embodiment of a seal.
Figures 6, 7:
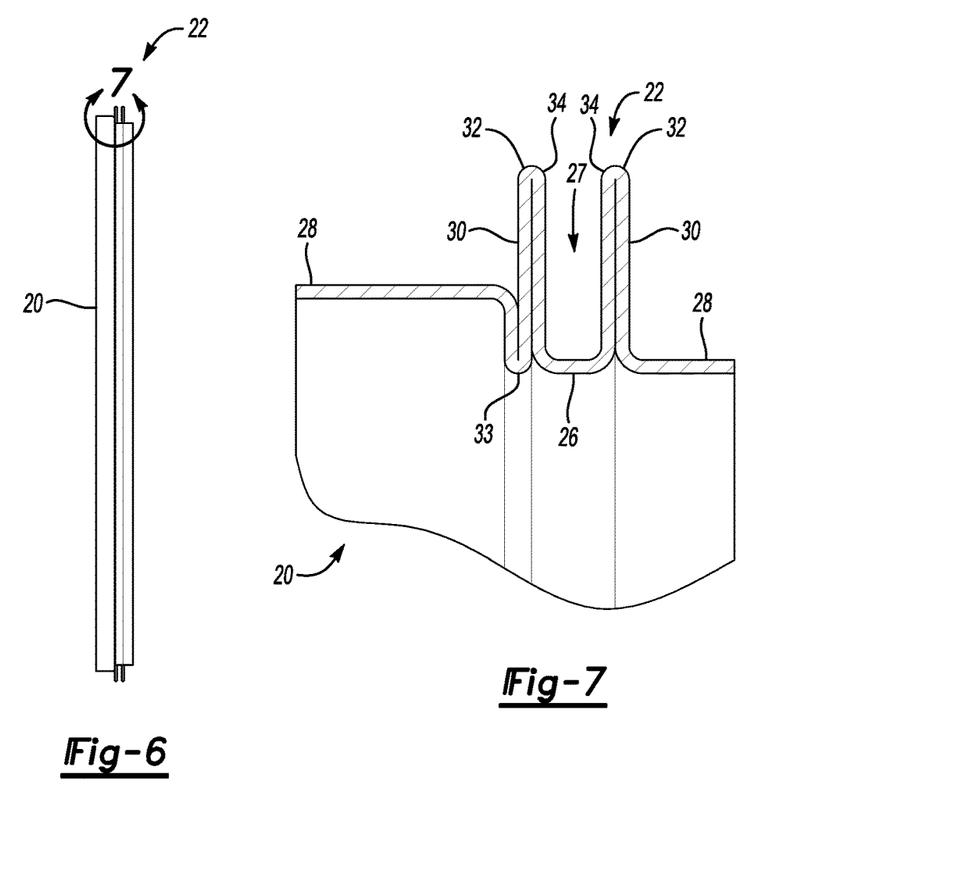
FIG. 6 is a sectional view of FIG. 5 along the line A-A.
FIG. 7 is a detail view of the profile of FIG. 6 labeled B.
Figure 8:
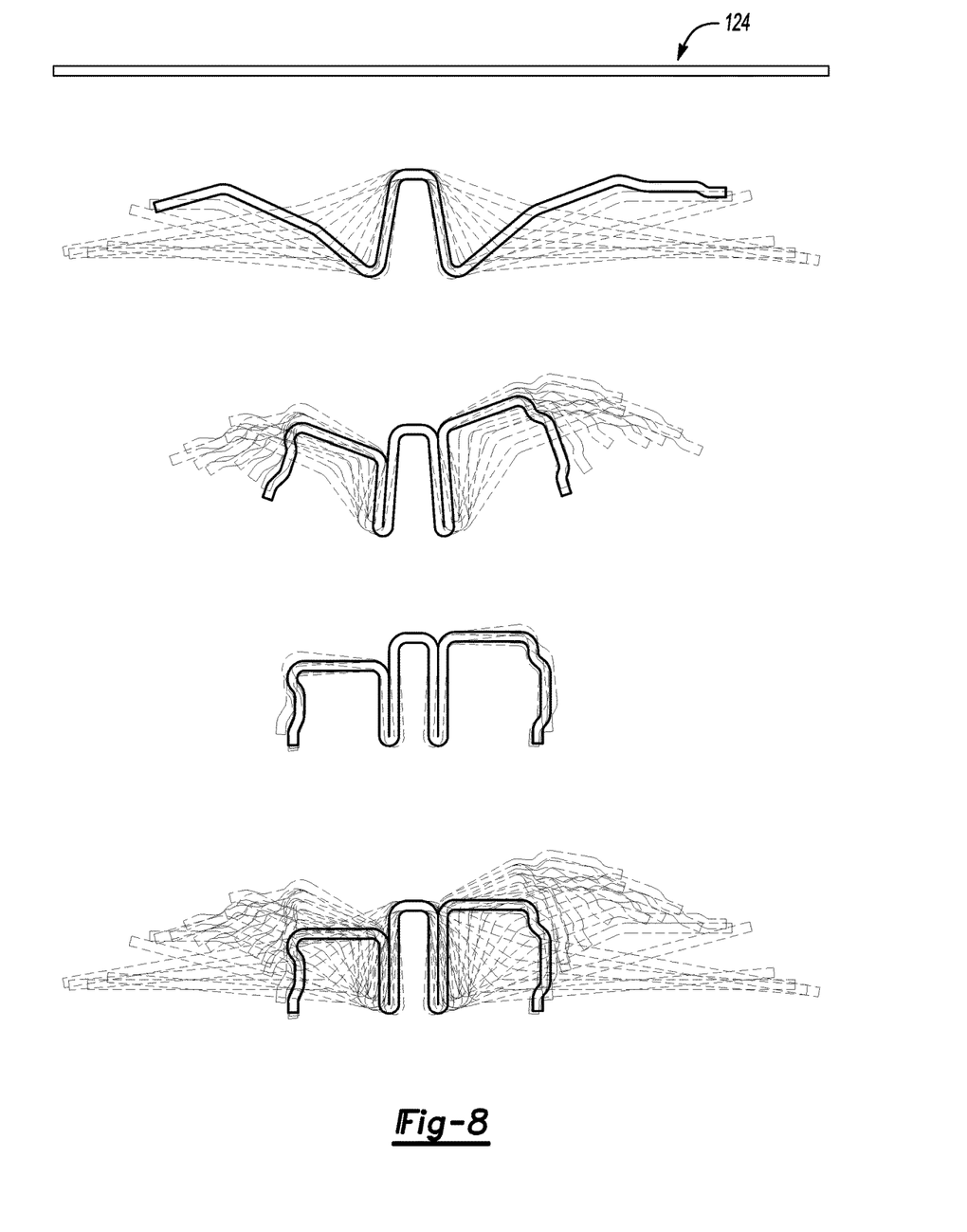
FIG. 8 are flower diagrams of the roll form process of another embodiment of a seal.
Figure 9:
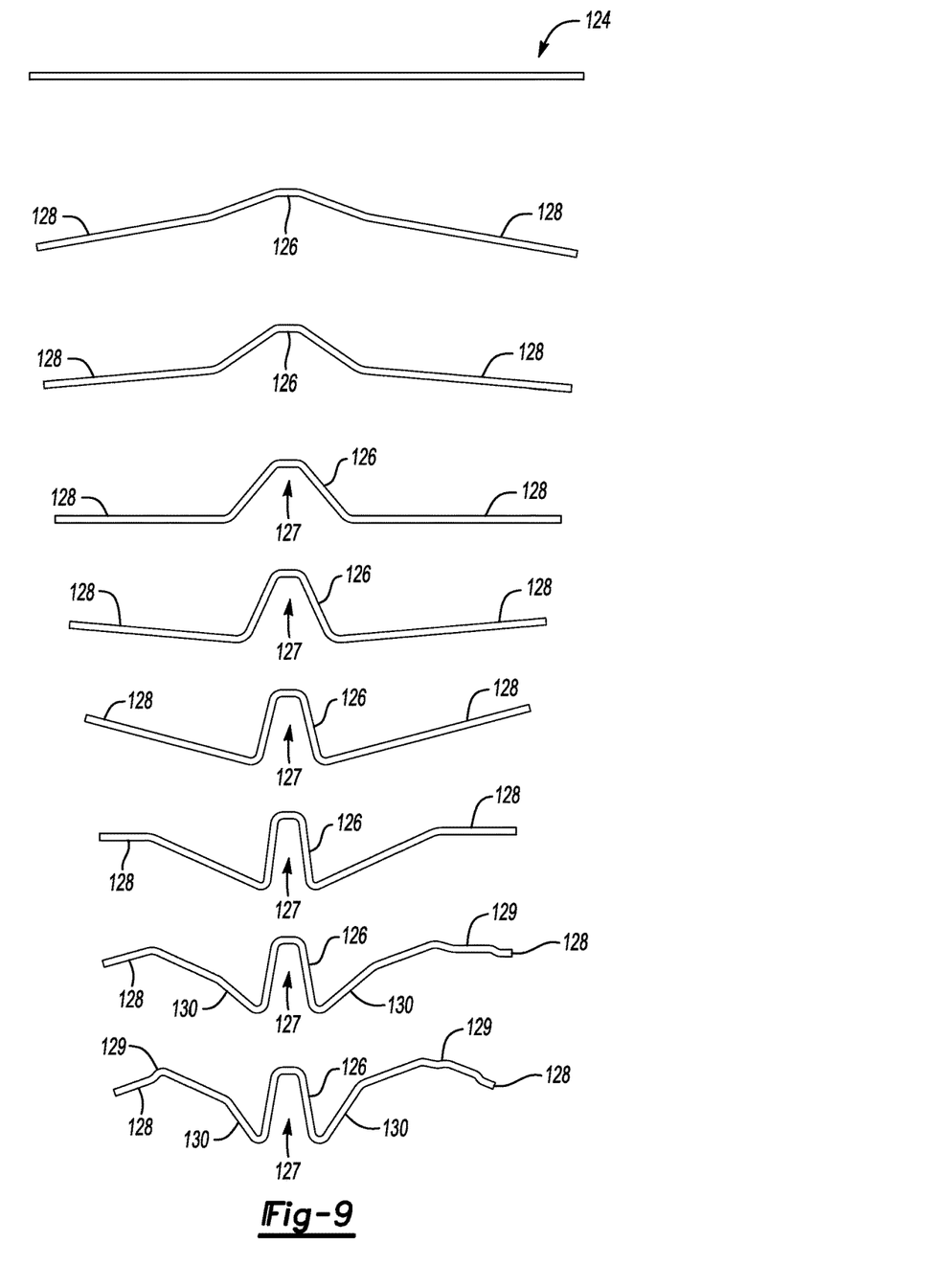
FIG. 9 are flower diagrams of the roll form process of passes 1-8 of another embodiment of a seal.
Figure 10:
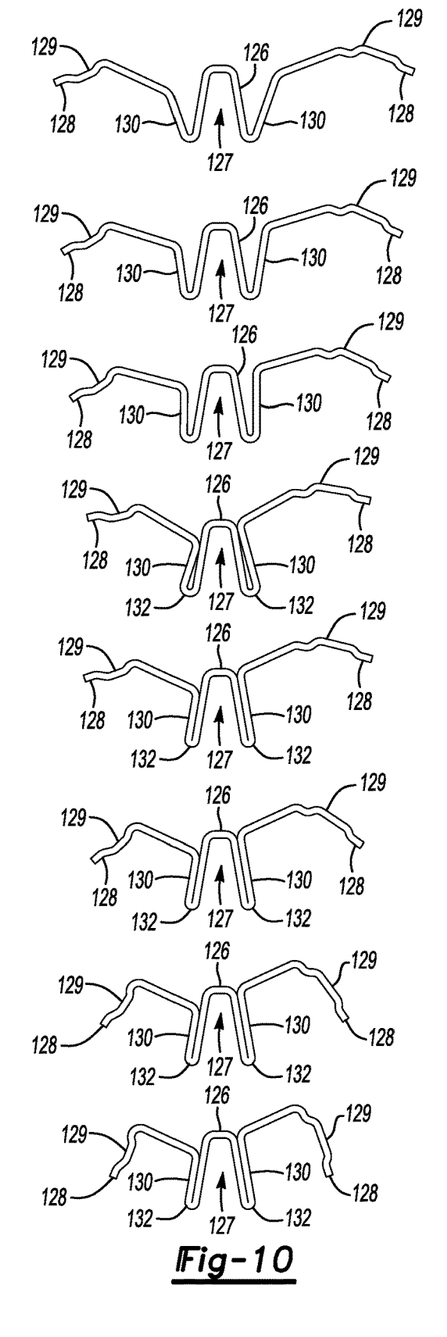
FIG. 10 are flower diagrams of the roll form process of passes 9-16 of another embodiment of a seal.
Figure 11:
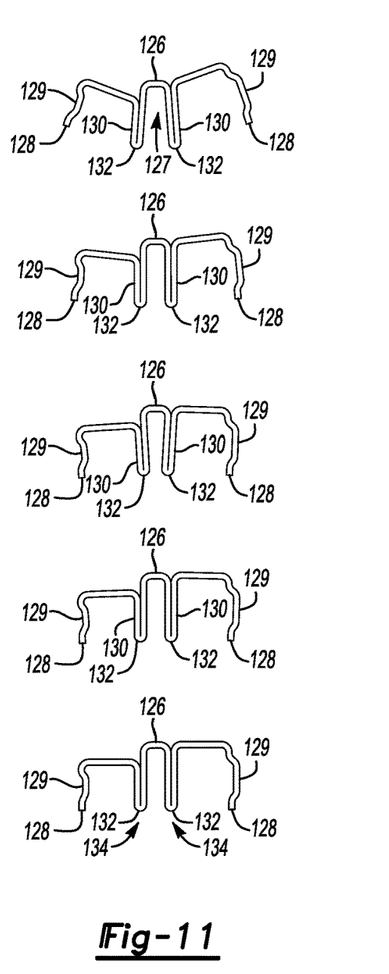
FIG. 11 are flower diagrams of the roll form process of passes 17-21 of another embodiment of a seal.

Following the roll forming steps outlined above, the finished profile may be coiled into an overlapping ring. In one aspect, the overlapping ring may be of a size such that when cut to a desired length it defines a desired diameter of the seal when joined. The finished profile may be cut to a desired length to provide a specified diameter for the seal 20. The cut ends may be joined in a joining operation such as welding to form a circular shaped seal 20 having the finished profile, as best seen in FIGS. 5-7.

The circular shaped seal 20 may be further processed such as in an annealing heat treatment to impart desired properties such as a specified strength, hardness, or ductility. Following the annealing treatment, the seal may be sized to be within a specified tolerance.

Referring to FIGS. 8-14 there is shown a process and structure of another embodiment of a seal 120 for an engine. The process includes roll forming in a plurality of passes an asymmetric profile 122 in a flat strip of material 124, coiling the formed asymmetric profile 122 into an overlapping ring, cutting the overlapping ring to a desired length and then joining the ends of the cut circular shape to form a seal 120 which is a circular ring of a specified diameter.

As shown in the figures, in passes 1-6 the flat strip stock 124 is incrementally deformed to have a generally U shaped profile 126 having a gap 127 and having distally extending legs 128. The distally extending legs 128 are deformed to include contours 129 that define a desired shape in the finished profile. In passes 7-11 the distally extending legs 128 are deformed to form generally V shaped profiles 130 on opposing sides of the U shaped profile 126. The distally extending legs 128 are also deformed to include contours 129 as described above in passes 1-6. Further, the distally extending legs 128 are deformed to form a radius 133 such that the legs extend at a predetermined angle which is further changed in the following process steps to form a defined angle which in the completed part extends at approximately 90 degrees. In passes 12-14 the V shaped profiles 130 are compressed to contact the generally U shaped profile 126. The V shaped profiles 130 include an approximate zero inside radius 132 such that the V shaped profile 130 is folded to contact the U shaped profile 126. The distally extending legs 128 are further deformed to form the desired angle as described above. In passes 15-21 the distally extending legs 128 are further deformed at a radius 133 to form the desired angle as described above.

Figures 12, 13, 14:
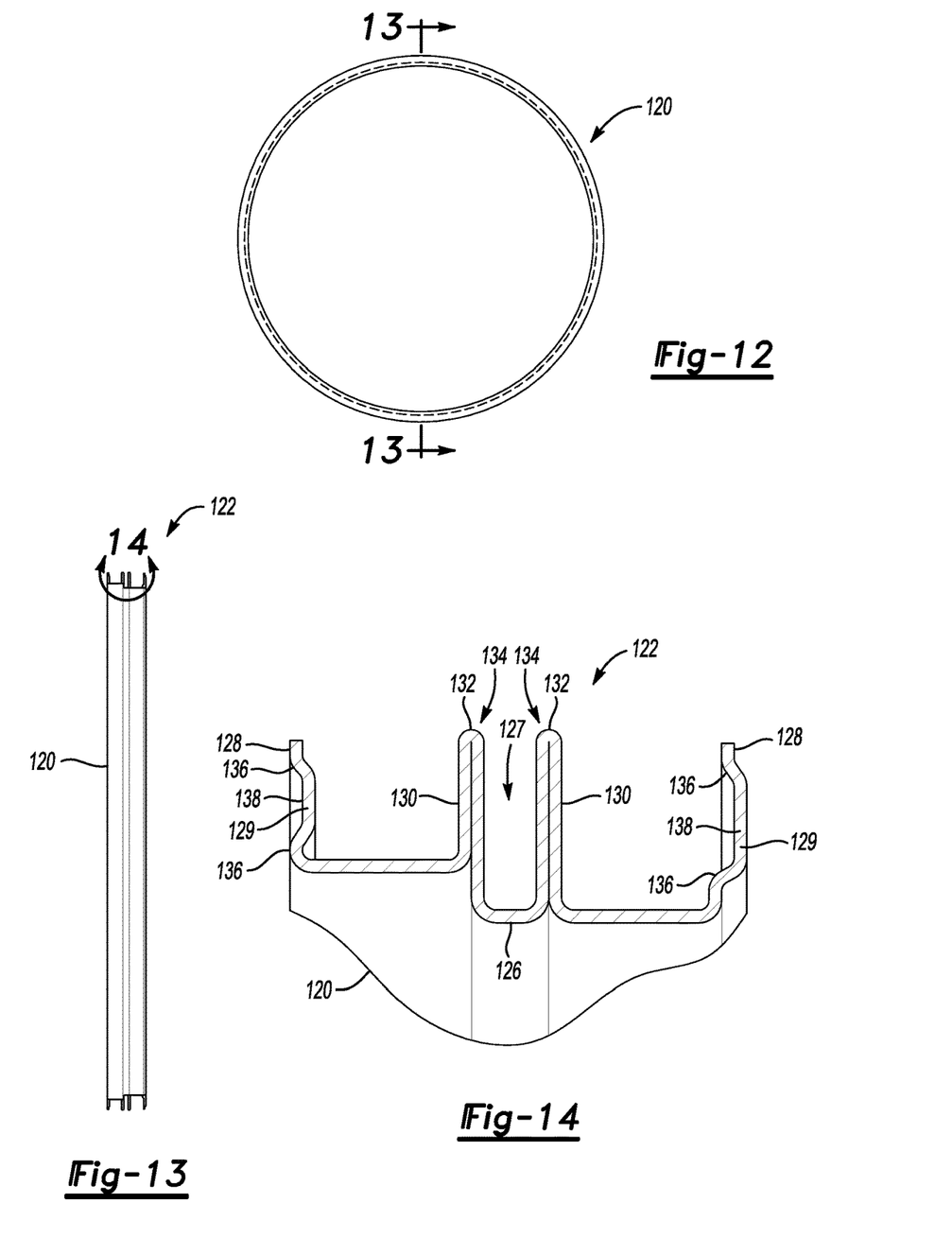
FIG. 12 is a perspective view of the seal following roll forming, coiling and joining of another embodiment of a seal.
FIG. 13 is a sectional view of FIG. 12 along the line A-A.
FIG. 14 is a detail view of the profile of FIG. 13 labeled B.

In the finished profile the strip includes at least two peaks 134 that are spaced from each other across the gap 127 of the U shaped profile 126 to define the asymmetric profile 122. In one aspect, the tolerances of the peaks 134 may be maintained to within two thousandths of an inch following the roll forming, coiling and joining steps.

In the depicted embodiment, the distally extending legs 128 include contours 129 and extend from the compressed V shaped profile 130 at a radius 133 at a desired angle. In one aspect the contours 129 include spaced radiused portions 136 with a notch or recess 138 defined between the spaced radiused portions 136.

Following the roll forming steps outlined above, the finished profile may be coiled into an overlapping ring. The finished profile may be cut to a desired length to provide a specified diameter for the seal 120. The cut ends may be joined in a joining operation such as welding to form a circular shaped seal 120 having the finished profile, as best shown in FIGS. 12-14.

The circular shaped seal 120 may be further processed such as in an annealing heat treatment to impart desired properties such as a specified strength, hardness, or ductility. Following the annealing treatment, the seal may be sized to within a specified tolerance.

While the process steps have been described above for various embodiments of a seal 20, 120. It should be realized that various configurations of the seal 20, 120 may be formed as determined by the type of engine. For example the peaks 34, 134 may have various heights and may be separated by various sized U shaped profiles 26, 126 and gaps 27, 127. Additionally, the distally extending legs 28, 128 may extend at various angles and may include various contours as determined by the engine type and application. In one aspect all designs of the seal 20, 120 include a U shaped profile 26, 126 with opposing peaks 34, 134 formed on opposing sides of the U shaped profile 26, 126. The peaks 34, 134, as specified above are defined by the V shaped profiles 30,130 being compressed on the U shaped profile 26, 126 at an approximate zero inside radius 32, 132 such that the V shaped profile 30, 130 is folded to contact the U shaped profile 26, 126.

The seals may be utilized in various turbine engines to provide an inter-stage seal between various sections of the turbine engine.

We claim:

1. A seal for a turbine comprising:
   a continuous bent asymmetric profile including opposing ends, the asymmetric profile including a U shaped profile defining a gap;
   at least two peaks formed on opposing sides of the gap, the at least two peaks directly contacting opposing sides of the U shaped profile at a zero radius;
   wherein the asymmetric profile includes an overlapping ring shape and the ends are joined.

2. The seal of claim 1 further including distally extending legs continuing from the at least two peaks.

3. The seal of claim 2 wherein the distally extending legs continue from the at least two peaks at a predetermined angle.

4. The seal of claim 2 wherein the distally extending legs include contours formed thereon defining a shape in the asymmetric profile.

5. The seal of claim 4 wherein the contours include spaced radiused portions with a notch or recess defined between the spaced radiused portions.

6. The seal of claim 2 wherein the distally extending legs continue from the at least two peaks and extend at a 90 degree angle relative to the at least two peaks.

* * * * *